United States Patent [19]

Colineau

[11] Patent Number: 5,189,579
[45] Date of Patent: Feb. 23, 1993

[54] MULTIPLE-TRACK RECORDING MAGNETIC HEAD WITH COMPACT MATRIX STRUCTURE

[75] Inventor: Joseph Colineau, Bures Sur Yvette, France

[73] Assignee: Thomson-CSF, Puteaux, France

[21] Appl. No.: 651,349

[22] PCT Filed: Jun. 1, 1990

[86] PCT No.: PCT/FR90/00385
§ 371 Date: Feb. 19, 1991
§ 102(e) Date: Feb. 19, 1991

[87] PCT Pub. No.: WO90/16063
PCT Pub. Date: Dec. 27, 1990

[30] Foreign Application Priority Data
Jun. 16, 1989 [FR] France .................. 89 08018

[51] Int. Cl.$^5$ .............................................. G11B 5/29
[52] U.S. Cl. ...................................... 360/121; 360/126
[58] Field of Search ............................... 360/121, 126

[56] References Cited

U.S. PATENT DOCUMENTS 3,492,663 1/1970 Bobeck et al. .
3,500,347 3/1970 Schweizerhof .
3,510,855 5/1970 Howells .
3,562,759 2/1971 Brewster .
3,662,361 5/1972 Mee .

OTHER PUBLICATIONS

IBM Technical Disclosure Bulletin, vol. 9, No. 1, Jun. 1966, Armonk, N.Y., U.S.A., pp. 66–67; P. A. Roland et al.: "Batch Fabrication of Magnitic Toroid Array", voir le document en entier.

Primary Examiner—A. J. Heinz
Attorney, Agent, or Firm—Oblon, Spivak, McClelland, Maier & Neustadt

[57] ABSTRACT

In the matrix magnetic head of the invention, the ferrite pads (4 to 8) of the magnetic circuits of the micro-heads are arranged quincunxially, and each pad is joined to the four neighboring pads by poles (9 to 12). There are therefore twice as many micro-heads as there are magnetic pads.

5 Claims, 3 Drawing Sheets

MULTIPLE-TRACK RECORDING MAGNETIC HEAD WITH COMPACT MATRIX STRUCTURE

BACKGROUND OF THE INVENTION

1. Field of the Invention

The present invention relates to a multiple-track recording magnetic head with a compact matrix structure.

2. Discussion of the Background

There is a recording magnetic head, known for example from the French patent application No. 88 05592, with a matrix structure, designed for multiple-track magnetic recording. A set such as this is formed by a dense network of magnetic micro-heads. This network has a set of substantially square-sectioned magnetic pads protruding outwards in a Cartesian matrix on a supporting substrate. The pads are generally formed by the grooving of a ferrite block. Conductors arranged in lines and columns are positioned in the grooves and are covered, or are buried in glass, and magnetic poles made of Sendust or a similar material are formed on the polished face of the grooves that are thus filled. These poles are all substantially parallel to one of the diagonals of the pads and, at each time, they join the facing corners of two pads, a narrow gap being made in the middle of these poles.

This head works suitably but, since it is necessary to form as many pads as there are micro-heads, the surface area occupied by the head is not used to the utmost efficiency.

The object of the present invention is a multiple-track magnetic head with compact matrix structure that makes it possible, for one and the same surface area of head, to have the greatest possible number of micro-heads, this result being achieved without any reduction in the efficiency of these micro-heads.

The multiple-track recording magnetic head with a compact matrix structure of magnetic heads, includes a matrix of pads made of a magnetic material protruding out of a supporting substrate made of magnetic material, and electrical conductors arranged in matrix form in the inter-pad spaces and covered with non-magnetic material. Each micro-head has a magnetic circuit formed by two neighboring pads. Part of the substrate joining the pads has poles made of material with high magnetic permeability formed on at least a part of the surface of each of these two pads which meet each other on non-magnetic material, substantially midway between the two pads, at a gap. Each magnetic pad is part of the magnetic circuit of four neighboring micro-heads, thus making it possible to have twice as many micro-heads as in known heads, for a total surface area of equal value.

BRIEF DESCRIPTION OF THE DRAWINGS

The present invention will be understood more clearly from the following detailed description of several embodiments, taken as non-restrictive examples and illustrated by the appended drawing, in which.

DETAILED DESCRIPTION OF THE INVENTION

Figure 1:
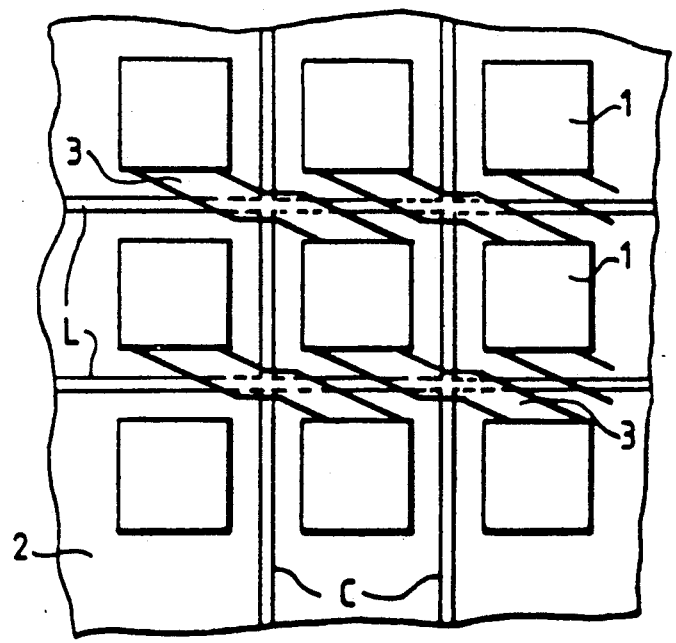
FIG. 1 is a partial front view of a prior art magnetic head.

The prior art magnetic head shown in FIG. 1 has a Cartesian network of magnetic pads 1. These pads have a square section and are formed on a ferrite substrate 2, for example by the grooving of this substrate with grooves in lines and columns. Line conductors L and column conductors C are positioned in these grooves and covered with glass. The surface of the glass is polished, and poles 3 are formed thereon. These poles 3 are substantially parallel to one of the diagonals of the pads and, each time, in forming a sort of contraction, they meet two pads, the corners of which are facing each other and the diagonals of which, ending at these corners, are in the prolongation of each other. A gap is formed in the middle of each of these contractions.

Figure 2:
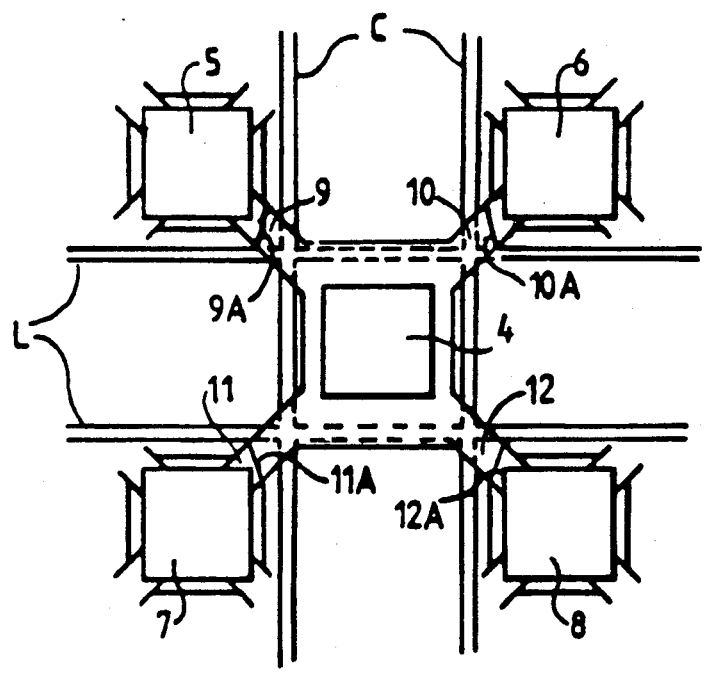
FIG. 2 is a partial front view of a magnetic head according to the invention.

The magnetic head of FIG. 2 has the same total surface area as that of FIG. 1, but has half as many pads, these pads being arranged quincunxially, i.e. any pad (except, naturally, the pads of the edge of the head) such as the pad 4, shown in the center of figure 2, is surrounded only by four other pads (5 to 8) whereas in the prior art head, one pad is surrounded by eight other pads (FIG. 1). For this notion of surrounding, it is important to note that we should actually consider not the pads themselves but the compartments that are demarcated by the wires of lines and columns and contain these pads. In the case of FIG. 2, there is no ambiguity but, for the FIGS. 8 and 9, there could be ambiguity and this is why, for these two FIGS. 8 and 9, we have shown the wires of lines and columns demarcating the lines and columns of pads.

Each pad of the head according to the invention is connected to the four pads that surround it by magnetic poles. In the example of FIG. 2, the pad 4 is connected to the pads 5 to 8 by "bridges" of poles referenced 9 to 12 respectively. Each bridge of poles has widened ends and a narrowed central part. Each of these bridges is formed by two poles corresponding to each of the pads connected by the bridge. These poles are symmetrical in relation to the middle of the bridge. Above the pads, the ends of these bridges may have blocks with a surface area equal to or slightly greater than that of these pads. The central parts of the bridges have a narrow gap (one micron or less) substantially at their middle. The gaps of the pole bridges 9 to 12 are respectively referenced 9A to 12A. Thus, in the head of the present invention, the pad 4 forms part of the magnetic circuit of the four neighboring pads 5 to 8 and of the four micro-heads, the gaps of which are referenced 9A to 12A.

Figure 3:
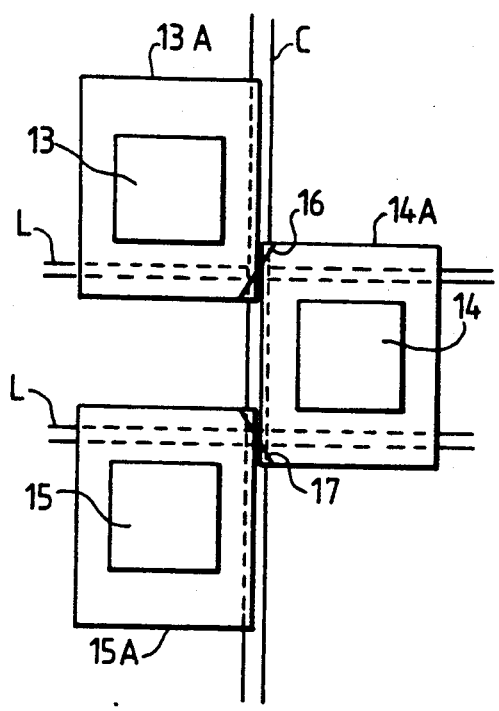
FIGS. 3 to 5 are partial front views of variants of magnetic heads according to the invention.
Figure 4:
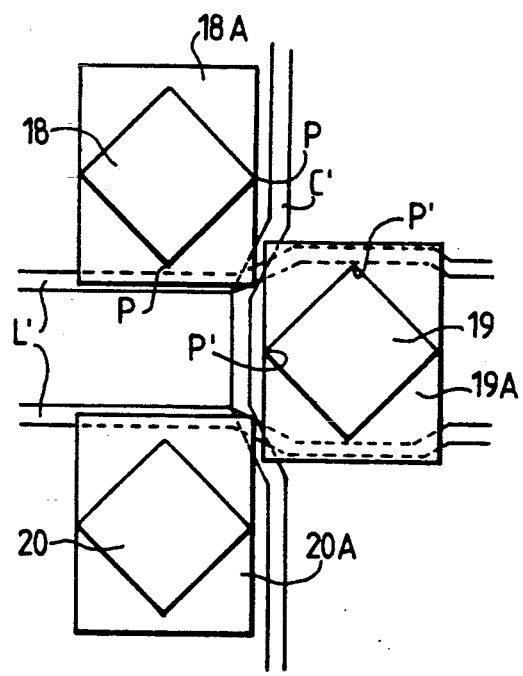
Figure 5:
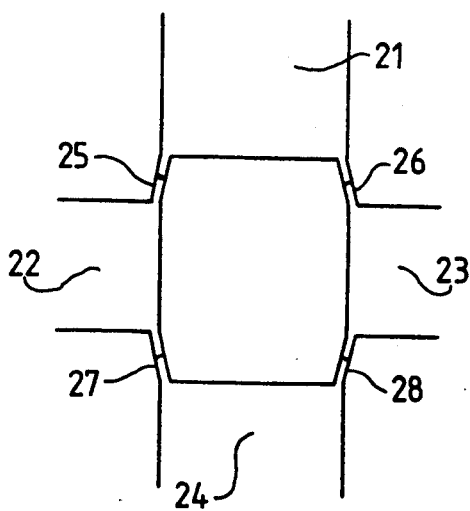

FIGS. 3 to 5 shows variants of embodiments of poles and pads.

In FIG. 3, the pads 13 to 15, which are the only ones shown, have sides parallel to the wires of lines and columns respectively. Herein, the poles are pole "blocks" 13A to 15A, surrounding the pads 13 to 15 respectively and meeting one another by their corners. These pole blocks have dimensions such that the zone of their meeting point has a width smaller than the length of the sides of the pads, in order to concentrate the magnetic flux in the gap that is made in this zone (gaps 16 between 13A and 14A, and 17 between 14A and 15A).

In the example of FIG. 4, the sides of the pads 18 to 20, which are the only ones shown, form an angle of about 45 degrees with the main directions of the wires of lines and columns, while the pole "blocks" 18A to 20A have sides parallel to these main directions. Since, in this example, the corners P of the pads of a row or of a column of pads are practically at the level of the corners P' of the pads of the adjacent line or column of pads, the line L' and column C' wires cannot be rectilinear and should skirt these corners.

In the example of FIG. 5, the network of pads is similar to that of FIGS. 2 and 3 (only the pads 21 to 24 have been shown). The poles 25 to 28 are narrow bands joining the facing corners of the pads. It is seen, in this figure, that a different azimuth can be given to the neighboring gaps.

Figure 6:
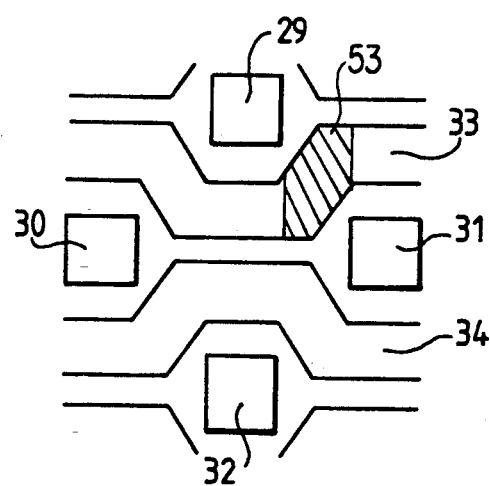
FIG. 6 is a view showing the place left free for the passage of the conductors in a head according to the invention.

FIG. 6 relates to a manufacturing method using the technique of thin layers to make the conductors or even the entire head. This FIG. 6 shows four pads 29 to 32 and line conductors 33, 34 occupying the maximum amount of space available between the pads while at the same time setting up a sufficient insulating space between them and with respect to the pads. These line conductors are then covered with an insulating layer, and the column conductors are deposited similarly. Region 53 is a region in which a column conductur to be deposited will overlap line conductor 33, as shown in FIG. 7.

Figure 7:
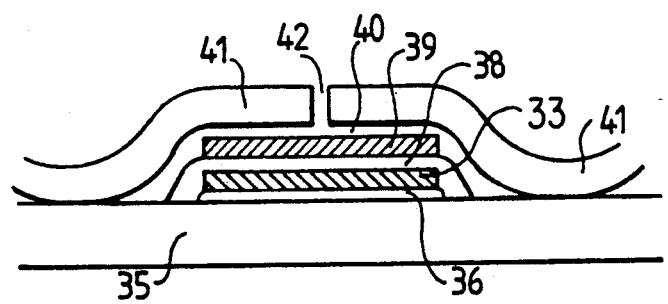
FIG. 7 is a partial sectional view of a head according to the invention, made according to the technique of thin layers.

FIG. 7 is a simplified sectional view of this embodiment. It shows the ferrite substrate 35 of the head, which may possibly also be made according to the thin layer technique. The following are deposited successively on this substrate 35: an insulator layer 36, a conductive layer 33, for example a line conductor, another insulator layer 38, a second conductive layer 39, for example a column conductor, an insulator layer 40 and a layer 41 of material constituting the poles, such as "Sendust". A gap 42 is made in this layer 41.

Figure 8:
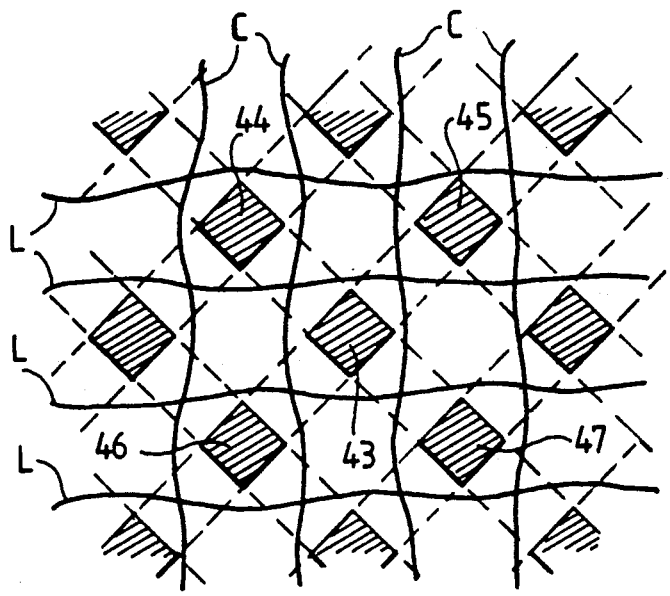
FIGS. 8 and 9 are schematic views exemplifying shapes of pads of the magnetic head according to the invention.

FIG. 8 shows a part of a network of pads similar to the network of FIG. 4. In this figure, the central pad 43 has only four pads that are "neighbors", as understood in the present invention, referenced 44 to 47. These neighbors are in "compartments" neighboring its own, the compartments being demarcated by consecutive line conductors and column conductors.

Figure 9:
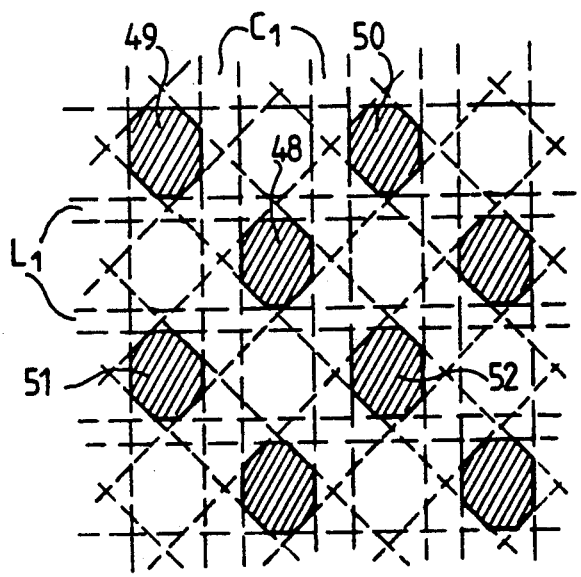

As specified here above with reference to FIG. 4, this embodiment of FIG. 4 does not make it possible to have rectilinear line conductors and column conductors when the network of pads is dense. To resolve this problem, it is possible, as shown in FIG. 9, to "trim" the corners of the pads such as the pads 48 to 52 of FIG. 9, the section of which becomes octogonal. The line conductors L1 and column conductors C1 may then be practically rectilinear without its being necessary to reduce the density of the network of pads. The pads may be prepared, for example, by making four grooves in a ferrite block: two orthogonal grooves along the direction of the wires and two grooves, orthogonal to each other, at 45 degrees to the first set of grooves.

The following are the main advantages of the magnetic head of the invention:
the excitation conductors have an inductance that is lower than in prior art heads, thus reducing the power consumed by the head and increasing its maximum operating frequency;
the conductors have a mutual inductance that is lower than in the prior art, which also reduces the power consumed and also increases the maximum operating frequency;
the efficiency of the micro-heads may be higher than in the prior art heads, since it is possible to widen the poles without creating excessively great parasitic fields, the distance between pads being greater;

In certain cases, these consecutive poles of one and the same line (such as the poles 9, 10 of FIG. 2) may have different directions. This means that their gaps then also have different directions. Thus, when the head is positioned with respect to the magnetic tape, on which it is recording, so that the consecutive gaps of one and the same line cooperate with consecutive tracks of this tape, these consecutive gaps, which therefore have different orientations, enable so-called "azimuthal" recording;
the operations of alignment between the upper structure (including the poles and the gaps) and the lower structure (the pads and their magnetic substrate) are simplified since it is possible to tolerate greater offsets, the neighboring pads being at a greater distance;
it is possible to make the conductors, and even the entire structure of the head, in thin layers. FIGS. 6 and 7, for example, show that the quincunxial arrangement of the pads makes it possible, for equal efficiency, to open up a far greater surface area than in the case of the head of FIG. 1 for the passage of the conductors. This characteristic is especially important, for the limitation of the section of the electrical conductors is presently one of the major obstacles to high density thin layer integration of the magnetic heads.

I claim:

1. A multiple-track recording magnetic head structure, comprising:
   a substrate comprising magnetic material;
   a matrix of pads on and connected to the substrate, each pad comprising magnetic-material,
   a matrix of electrical column and row conductors disposed above regions of the substrate that are between the pads;
   a matrix of magnetic poles comprising magnetic material, each pole contacting a pad and opposing across a gap another one of the poles which contacts another one of the pads, said gap substantially midway between adjacent pads,
   wherein each set of opposing poles and pads contacted thereto forms, in combination with the substrate, a broken magnetic loop which is broken only by the corresponding gap, wherein two electrical conductors of the matrix of electrical conductors are enclosed by the broken loop;
   wherein each magnetic pad contacts four of the poles.

2. A magnetic head according to claim 1, wherein the pads are arranged quincunxially with respect to the electrical conductors.

3. A magnetic head according to claim 1, wherein the electrical conductors are thin and flat.

4. A magnetic head structure according to claim 1, wherein the poles are thin and flat.

5. A magnetic head structure according to claim 1, wherein the electrical column and row conductors are insulated from one another and from the broken loops.